US005916946A

United States Patent [19]

Poncelet et al.

[11] Patent Number: 5,916,946

[45] Date of Patent: Jun. 29, 1999

[54] ORGANIC/INORGANIC COMPOSITE AND PHOTOGRAPHIC PRODUCT CONTAINING SUCH A COMPOSITE

[75] Inventors: Olivier J. Poncelet; Jeannine Rigola, both of Chalon Sur Saone, France

[73] Assignee: Eastman Kodak Company, Rochester, N.Y.

[21] Appl. No.: 08/959,751

[22] Filed: Oct. 29, 1997

[30] Foreign Application Priority Data

Nov. 26, 1996 [FR] France .................................. 96 14724

[51] Int. Cl.$^{6}$ ...................................................... C08K 3/18

[52] U.S. Cl. ............... 524/430; 106/287.12; 106/287.16; 106/287.17; 524/437; 524/492; 524/493

[58] Field of Search .................................... 524/430, 437, 524/492, 493; 106/287.12, 287.16, 287.17

[56] References Cited

U.S. PATENT DOCUMENTS

| | | |
|---|---|---|
| 4,571,361 | 2/1986 | Kawaguchi et al. . |
| 5,360,706 | 11/1994 | Anderson et al. . |

FOREIGN PATENT DOCUMENTS

| | | |
|---|---|---|
| 1525140 | 9/1978 | United Kingdom . |
| 2075208 | 11/1981 | United Kingdom . |
| WO 94/24607 | 10/1994 | WIPO . |
| WO 96/13459 | 5/1996 | WIPO . |

OTHER PUBLICATIONS

Derwent Abstract 92/111165, Derwent Publications, Ltd., London.

*Primary Examiner*—Melvyn I. Marquis
*Attorney, Agent, or Firm*—Carl F. Ruoff

[57] ABSTRACT

The present invention concerns an organic/inorganic composite product.

This composite product results from the formation of a polymeric alumino-silicate in situ in an organic polymeric matrix such as a polyalkyene glycol.

Application to the obtaining of an antistatic layer, notably for photographic products.

7 Claims, No Drawings

ORGANIC/INORGANIC COMPOSITE AND PHOTOGRAPHIC PRODUCT CONTAINING SUCH A COMPOSITE

FIELD OF THE INVENTION

The present invention concerns a novel organic/inorganic composite and a method for preparing it. The invention also concerns the application of this novel composite in the production of photographic coatings and products.

BACKGROUND OF THE INVENTION

When subjected to handling or physical and mechanical treatments, notably involving friction, the surfaces of plastic films become charged with static electricity.

This static electricity causes dust to attach to the surface of the film and results in a risk of discharge, sparks or even ignition when the charge becomes high. When the plastic film is used as a support for a photographic product, these phenomena are particularly troublesome in terms of the quality of the final image. This is why numerous substances have been proposed in the prior art for reducing electrostatic charging. These substances are mixed with various carriers or additives in order to produce antistatic compositions which are then applied in layers to photographic supports or products. A review of antistatic agents which can be used in photography can be found, for example, in Research Disclosure No 501, September 1994, Publication 36544, page 520.

The very abundance of the substances cited in this publication and the dates of the references show that it is difficult to find antistatic substances which give full satisfaction. Some substances interact with the components of the photographic product and the image-forming mechanism, others are insufficiently stable or exude layers in the area where they have been incorporated, others are difficult to formulate as they require grinding and dispersion operations involving organic solvents, and finally, many have insufficient effect on electrostatic charging.

The applicant recently discovered a novel substance which is a fibrous inorganic polymer of aluminium and silicon, with antistatic properties. This substance and a method for its synthesis are described in the international patent application WO 96/13459 filed on Oct. 24, 1995 and entitled "New Polymeric Conductive Alumino-Silicate Material, Element Comprising said Material and Process for Preparing it".

The object of the present invention is a novel composite based on an organic polymer and a polymeric alumino-silicate. This material will be referred to hereinafter as an organic/inorganic composite.

SUMMARY OF THE INVENTION

The organic/inorganic composite according to the invention results from (1) the formation in situ of a fibrous polymeric alumino-silicate, of the type described in the aforementioned patent application WO 96/13459, and (2) the growth of this fibrous polymericalumino-silicate, characterised in that steps (1) and (2) are performed in a water-soluble organic polymer, stable in the range of from about pH 4 to about pH 7 and of forming substantially no chelate with the Al+++ ion, said organic/inorganic composite having in its FT Raman spectrum a peak at around 867 $cm^{-1}$, shifted by less than 5 $cm^{-1}$ with respect to the corresponding peak produced by the same fibrous polymeric alumino-silicate except that it is obtained without the organic water-soluble polymer.

The organic/inorganic composite according to the invention comprises a fibrous, polymeric alumino-silicate with the formula $Al_xSi_yO_z$ in which x:y is between 1 and 3, and preferably between 2 and 2.5, and z is between 2 and 6. The organic polymer is stable in the pH range 4–7 and is devoid of groups capable of chelating the aluminium combined in the polymeric alumino-silicate.

According to the present invention, the organic polymer is also water-soluble, that is to say, when mixed with water in the proportions specified hereinafter and at a temperature approximately between ambient temperature and 75° C., it provides a homogeneous, optically clear solution, when examined by the naked eye.

The organic polymer of the composite according to the invention serves as a matrix for the polymeric alumino-silicate, preserving the structure of the latter and the Si/Al ratio, and thus the intrinsic antistatic characteristics of this alumino-silicate. This is why one of the conditions to be observed according to the invention is the absence, in the organic polymer, of chelating groups which, by capturing the Al ions in order to form a chelate, would at the same time prevent the formation and growth of the alumino-silicate and would affect its antistatic properties. Such chelating groups are notably acid groups, such as polyacids such as the acrylic acid polymers or hydrolysed vinyl acetate polymers.

The organic polymer must also make it possible to produce a composition which can be applied in layers using normal techniques, that is to say in particular a composition having sufficient viscosity. The viscosities required for applying the various layers of a photographic product are well known. Depending on the destination of the layer (back layer, substratum, top layer), a person skilled in the art will thus be able to adjust the viscosity of the layering composition using the usual parameters, concentrations, thickening agents etc. The layer obtained must be compatible with the other layers of a photographic product, that is to say it must exhibit appropriate adhesion, after drying, and if applicable after photographic processing, for the adjacent layers and/or for the support.

Useful organic polymers comprise hydrophilic cellulosic substances such as methyl cellulose, ethyl cellulose, hydroxyethyl cellulose, hydroxypropyl methyl cellulose, poly(alkylene oxides) where the alkylene groups advantageously have from 1 to 6 carbon atoms, such as poly (ethylene oxides), polyalkylene glycols, such as polyethylene glycols, modified poly(alkylene glycols) where the alkylene groups advantageously have from 1 to 6 carbon atoms, such as poly(ethylene glycol)bis(carboxymethyl) ether, or poly(ethylene glycol)alkyl ether, for example methyl ether, with a molecular weight of between 1,000 and $10^7$.

DESCRIPTION OF THE PREFERRED EMBODIMENTS

In the composite according to the invention, the alumino-silicate is obtained according to the method described in the aforementioned patent application WO 96/13459. According to this patent application, the method comprises the following main steps:

(a) mixed aluminium and silicon alkoxide, or a precursor of such an alkoxide, is mixed with an aqueous alkali, with a pH between 4 and 6.5, and advantageously between 4.6 and 5.6, so that the aluminium concentration at the end of step (a) is between $5\times10^{-4}$ M and $10^{-2}$ M, (b) the mixture obtained at (a) is heated to a temperature below 100° C. in the presence of silanol groups, for example in the form of divided silica, for a period sufficient to obtain a complete reaction culminating in the formation of a polymer, and (c) the ions are eliminated from the reaction mixture obtained in (b).

The reaction of step (b) is considered to be complete when the reaction medium no longer contains any cations other than those of the alkali, that is to say the Al and Si ions have been consumed.

The characteristic of the present invention consists of adding, prior to step (b), an organic polymer satisfying the conditions cited above. The organic polymer can be added directly in powder form to the medium. It is also possible, notably if the organic polymer has a high molecular weight, to solubilise it first in water and then add it to the medium in the form of a solution.

According to an embodiment, it is possible to isolate the substance prepared at step (a) by adjusting the pH in order to form a sol, centrifuging this sol, then redispersing it, as illustrated in the examples hereinafter.

According to an embodiment, the starting product, in step (a), is a precursor which is the product of the reaction of hydrolysing an aluminium salt, for example, aluminium chloride, and a silicon alkoxide.

The alumino-silicate (expressed as total Al+Si) represents between 20 and 66% and preferably between 30 and 50% by weight of the total dry weight of the composite. This represents an organic polymer/Al+Si ratio by weight of between 50 and 400% and advantageously between 75 and 200%.

If the organic polymer/aluminosilicate ratio is too high, the conductive properties are weakened and the effectiveness of the composition as an antistatic agent decreases. If the organic polymer/alumino-silicate ratio is too low, the composition, once applied in a layer, adheres poorly to the adjacent layers and, in addition, part of the alumino-silicate can migrate into these adjacent layers.

The composite according to the invention can contain different additives designed to improve either the antistatic properties, for example, doping agents, or to improve conductivity, such as lithium salts, calcium salts, magnesium salts or alkaline-earth salts, or characteristics aiding coating, for example, thickeners, wetting agents, surfactants, or preservatives. Examples of additives and references to the published literature concerning them are given in Research Disclosure, Publication No 36544, September 1994, Chapter IX "Coating physical property modifying addenda", pages 519–520. With regard to the metal cations, it is preferable that they are not present at the initial stage in the organic polymer.

Preferably, as has been indicated, the organic polymer provides a homogeneous, optically clear and transparent solution which can be applied in a layer using conventional techniques, if necessary in the presence of layering aids, thickening agents or surfactants. The layer is obtained from the composition using the usual coating techniques, using a hopper, spinner, curtain etc. The layer obtained has a thickness, after drying, from 0.1 $\mu$m to 10 $\mu$m; layers of a smaller thickness can be envisaged, but the antistatic characteristics are then not as good. The layer is transparent, although this is not essential in the case of some photographic products in which the antistatic layer is, for example, applied to the back of an opaque support. The resistance of the layer is between $10^8$ and $5\times10^{11}$ ohms and preferably between $5\times10^8$ and $5\times10^{10}$ ohms at room temperature (25° C.) and at a relative humidity of 25%.

In general, the organic polymer used is not initially cross-linked, in order to promote the formation of the alumino-silicate, but the final layer obtained can nevertheless be tanned with the tanning agents normally used in the preparation of photographic products (see Research Disclosure, Publication 36544, September 1994, Chapter II-B, page 508).

The composite according to the invention can be used in preparing back layers, substrata, intermediate layers or top layers, in all types of photographic product where an antistatic layer is needed, in particular, but not exclusively, a transparent, permanent antistatic layer, that is to say a layer keeping, after the processing of the exposed photographic product, at least some of its antistatic properties, to a sufficient degree to avoid for example the disadvantages related to dust and contaminants which are likely to be deposited on the surface of this product. In general, the layers produced with the organic composite of the invention behave satisfactorily in terms of adhesion characteristics (for the support, the substratum or adjacent layers), and the stability of the physical or electrical characteristics in an alkaline medium.

The support for the product can consist of the substances described in Research Disclosure, aforementioned publication, Chapter XV, page 531, in particular polyester or cellulose triacetate.

The following examples illustrate the invention.

EXAMPLE 1

A polymeric alumino-silicate is prepared using the following procedure:

A solution of 12.79 g ($8.4\times10^{2}$ mol.) of $Si(OCH_3)_4$ (Aldrich) in 5,000 ml of osmotically filtered water is prepared. Stirring vigorously, this solution is added to a solution of 36.52 g ($15.12\times10^{-2}$ mol.) of $AlCl_3,6H_2O$ (Aldrich). Stirring is continued until a clear solution is obtained (20–30 minutes). The pH is adjusted to 4.5 with a solution of 1M NaOH. A sol is obtained which is left to rest for several hours at room temperature until it clears. A solution of 1M NaOH is added drop-wise in order to adjust the pH to 6.8. A precipitate is obtained which is isolated by centrifuging and redispersed immediately with a solution of 1M hydrochloric acid and 2M acetic acid. To this solution is added an organic polymer in accordance with the indications in the table below. The volume is adjusted to 11,000 ml of osmotically filtered water and the solution heated to reflux at a temperature of 94–98° C. for 5 days. It is left to cool to room temperature, and then an ammonia solution is added in order to adjust the pH to 8.0. An aqueous gel is obtained which is centrifuged for 15 minutes at 3,000 rpm and the supernatent liquor is removed. The gel is resolubilised with a few drops of 12N HCl and the solution is dialysed with osmotically filtered water for 3 days. The composite obtained is applied in a layer to a polyester support so as to obtain an 80 mg quantity of Al+Si per $m^2$. Several sample layers are made in this way with the polymers listed in Table 1 below.

Each of the samples is tested in order to measure its surface resistance. To this end, a kinetic measurement of the charges is effected using the following procedure: a film sample 270x35 mm in size is disposed between two electrodes. The ends of the sample rest on these 2 electrodes. Then a voltage is applied between the two electrodes and a resistance value in ohms is read off. Each sample is tested freshly prepared, after being stored for 3 days at 25° C. and 35% relative humidity.

The results obtained are listed in Table 1 below.

TABLE 1

| Organic polymer | Organic polymer/AlSi as % | Resistivity |
|---|---|---|
| Polyethyelene glycol molecular weight 6,000 | 50 | $2.71 \times 10^9$ |
| Polyethyelene glycol molecular weight 6,000 | 100 | $4.76 \times 10^9$ |
| Polyethyelene glycol molecular weight 6,000 | 150 | $9.52 \times 10^9$ |
| Polyethyelene glycol molecular weight 6,000 | 200 | $3.50 \times 10^{10}$ |
| Polyethyelene glycol molecular weight 12,000 | 120 | $1.05 \times 10^9$ |
| Polyethyelene glycol molecular weight 20,000 | 120 | $1.43 \times 10^{10}$ |
| Polyethyelene glycol methyl ether, molecular weight 5,000 | 100 | $3.0 \times 10^{10}$ |

In these different composites, the Al/Si ratio measured either by X-ray spectrometry, known as "energy Dispersive X-ray spectrometry" (EDX), or by emission spectrometry, known as "Inductively Coupled Plasma" (ICP), is between 2 and 2.3. It is found that the resistance of these composites means that they can be used as antistatic agents.

EXAMPLE 2

The procedure of Example 1 is repeated, using as an organic polymer an ethylene polyoxide with a molecular weight of $10^6$. Two tests are carried out, one with the ethylene polyoxide being added directly in powder form, the other with the ethylene polyoxide first being dissolved in water, this solution being stirred continuously for 12 hours, the solution then being added to the digestive medium.

The results are listed in Table 2.

TABLE 2

| Organic polymer | Organic polymer/AlSi as % | Surface resistivity ohm/square |
|---|---|---|
| Direct addition | 100 | $1.08 \times 10^{10}$ |
| Pre-solubilisation | 100 | $2 \times 10^9$ |

EXAMPLE 3

The procedure of Example 1 is repeated in order to prepare a first organic/inorganic composite based on alumino-silicate and polyethylene glycol with a molecular weight of 6,000 (sample 3A) and a second composite based on alumino-silicate and polyethylene glycol methyl ether with a molecular weight of 5,000 (sample 3B).

Then the sample 3C is prepared in the following way. 1 liter of alumino-silicate dispersion prepared as in Example 1, comprising 0.707 g/l of Al+Si, is introduced into a 5 liter reactor. 1 liter of a 100% aqueous solution of polyethylene glycol (molecular weight 6,000) is added. This is heated at 96° C. for 5 days. After cooling, the pH is adjusted to 8 with N $NH_4OH$. A gel is formed. This gel is separated from the supernatent liquor by centrifuging at 3,200 rpm for 20 minutes. The gel is re-dissolved with several drops of 12N HCl, and then dialysed through a cellulose membrane (MWCO: 3,500 Dalton). The above procedure is repeated, replacing the polyethylene glycol with polyethylene glycol methyl ether (molecular weight 5,000). Sample 3D is obtained. In samples 3C and 3D, the organic alumino-silicate polymer are mixed, whereas in samples 3A and 3B the alumino-silicate is formed in situ in the organic polymer, according to the invention. An FT Raman spectrometry is performed (Brucker apparatus consisting of an FRA-106 module mounted on an IFS-106 spectrometer and equipped with a YAG laser source emitting at 1,064 nm and with a GE type quantal detector) on each of the samples 3A to 3D and on a sample of alumino-silicate prepared according to the procedure of Example 1 but without organic polymer. For each sample the deviation observed with respect to the 870 $cm^{-1}$ line of the pure alumino-silicate is noted. The conductivity of each sample 3A to 3D is also noted.

The results are compiled in Table 3.

TABLE 3

| Sample | Organic polymer | FT Raman | Δ | Conductivity |
|---|---|---|---|---|
| Alumino-silicate | | 870 | | |
| 3A | PEG 6000 | 867.1 | −2.9 | $4.76 \times 10^9$ |
| 3B | PEME 5000 | 867.5 | −2.5 | $3.0 \times 10^{10}$ |
| 3C control | PEG 6000 | 860.4 | −9.6 | $10^{12}$ |
| 3D control | PEME 5000 | 862.5 | −7.5 | $3.5 \times 10^{11}$ |

The invention has been described in detail with particular reference to certain preferred embodiments thereof, but it will be understood that variations and modifications can be effected within the spirit and scope of the invention.

What is claimed is:

1. An organic/inorganic composite obtained by the steps comprising:

a) treating a mixed aluminium and silicon alkoxide, or a precursor of such an alkoxide, with an aqueous alkali, at a pH in the range of from about 4 to about 6.5, while maintaining the Al:Si molar ratio between 1 and 3, so that at the end of step (a) the Al concentration is between $5\times10^{-4}$ and $10^{-2}$ M, (b) heating a mixture obtained in step (a) to a temperature lower than the boiling point of water, in the presence of silanol groups, for a period sufficient to obtain a complete reaction forming a polymeric alumino-silicate, (c) eliminating ions from the mixture obtained in step (b), wherein step (a) is carried out in the presence of a water-soluble organic polymer, stable in the range of from about pH 4 to about pH 7 and forming substantially no stable chelate with the aluminium ions, so as to obtain an organic/inorganic composite having in its FT Raman spectrum a peak at around 867 $cm^{-1}$, shifted by less than 5 $cm^{-1}$ with respect to the corresponding peak observed on the polymeric alumino-silicate obtained as indicated in steps (a), (b) and (c) above, but without the water-soluble organic polymer.

2. The organic/inorganic composite of claim 1, wherein the organic polymer is a polyalkylene glycol.

3. The organic/inorganic composite of claim 2, wherein the organic polymer is a polyethylene glycol.

4. The organic/inorganic composite of claim 1, wherein the organic polymer is a modified polyethylene glycol.

5. The organic/inorganic composite of claim 4, wherein the organic polymer is a polyalkylene glycol alkylether.

6. The organic/inorganic composite of claim 1, wherein the organic polymer is a poly(ethylene oxide).

7. The organic/inorganic composite of claim 1, wherein the organic polymer is a cellulosic polymer.

* * * * *